No. 659,357. Patented Oct. 9, 1900.
W. E. ATHEARN.
APPARATUS FOR LOCATING FAULTS IN ELECTRIC CIRCUITS.
(Application filed Jan. 23, 1899.)
(No Model.)
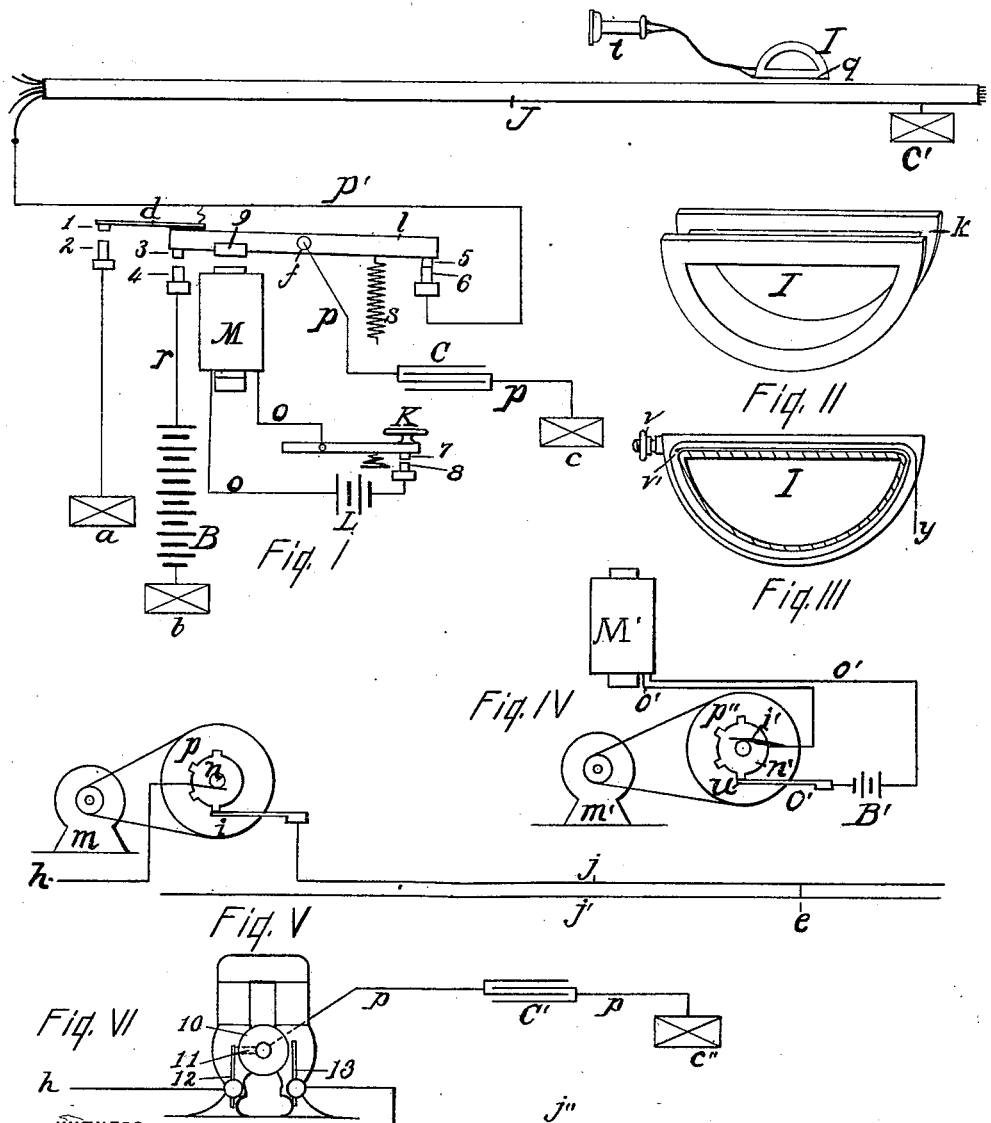

UNITED STATES PATENT OFFICE.

WILLIAM EDWARD ATHEARN, OF NEW YORK, N. Y.

APPARATUS FOR LOCATING FAULTS IN ELECTRIC CIRCUITS.

SPECIFICATION forming part of Letters Patent No. 659,357, dated October 9, 1900.

Application filed January 23, 1899. Serial No. 703,094. (No model.)

*To all whom it may concern:*

Be it known that I, WILLIAM EDWARD ATHEARN, a citizen of the United States, and a resident of New York, (Brooklyn,) in the county of Kings and State of New York, have invented certain new and useful Improvements in Locating Faults in Electric Circuits, of which the following is a specification.

My invention relates to the locating of faults in electric circuits—such as grounds, leaks, crosses, &c.—and has for its object means for locating the fault quickly, surely, and precisely. The object is attained by the means set forth in this specification and the accompanying drawings, in which—

Figure I illustrates a means for the purpose by means of signaling devices easily obtainable in telegraph-offices. Figs. II and III are details of one of the locating instruments. Fig. IV is a device for mechanically operating the magnet shown in Fig. I. Fig. V illustrates a mechanical means of signaling for the purpose with a current from either a battery or dynamo. Fig. VI shows a mechanical means of signal transmission for the purpose that may be substituted for the apparatus shown in Fig. I.

Like characters refer to like parts in the several views.

In Fig. I, J represents a lead-incased cable in which one of the inclosed lines has a leak to ground at the point $c'$. This faulty line, which will herein be termed an "interrupted circuit," we will suppose to be connected with line $p'$, coming from the combination of apparatus illustrated.

I, Fig. I, represents what I call an "inductor," which, chiefly for convenience, I make in the form shown. It consists of a block, as shown in Fig. II, grooved around its edges to receive a liberal winding of fine wire. Binding-posts are provided at convenient points, to which terminals of the wire may be united and to which the cords of a telephone $t$ may be attached, as shown in Fig. I. Fig. III illustrates the hollow semicircular block in vertical cross-section, showing how the wire $y$, issuing from the binding-post $v$ at $v'$, is wound around the block. This block or frame may be of wood, hard rubber, fiberite, or other suitable non-conducting material.

When this inductor, with the telephone attached, is held with its plain face $q$ parallel with a conductor over which signals are passing, the signals will be repeated in the telephone. When held against a cable, the multiplicity of signals passing through the cable produce a great noise in the telephone, which in some instances will amount to a musical note. If through one of the wires in the cable an impulse be sent of considerably-higher voltage than any in use upon the other lines, it will be distinctly manifest above all the other sounds. An inductor with a given number of convolutions of fine wire that reproduced the confusion of sounds made by the usual signals passing through the cable and made them discernible at a distance of three feet from the cable at a distance of four feet from the cable distinctly repeated impulses from a condenser sent into one of the wires of the cable. Nearer to and close against the cable the said impulses were very clear. For the purpose of sending signaling-impulses of such higher voltage through a line I employ apparatus as is hereinafter described. The apparatus itself may be varied in construction and arrangement indefinitely, and while I obtain excellent results with the inductor described it must be borne in mind that almost any form of coil will answer for an inductor, especially if distance and noise do not require a particular distinctness of the repeated signals.

Referring to Fig. I, B represents a battery, which while not equal perhaps to any in use on the lines in the cable will, in conjunction with the condenser C, have the desired capacity. The battery is grounded at $b$, and its other terminal ends in the contact-point 4 through the line $r$. A "walking-beam" relay-lever is shown at $l$ as rocking upon the pivot $f$. It is provided with contact-points 3 5, and by spring $s$ the point 5 is held normally against the point 6. A magnet M under one end of the lever $l$ is subject to impulses through it from the battery L by the key K through the contact-points 7 8 and lines $o$ $o$. A condenser C is grounded at one end at $c$ and is connected with the lever $l$ by the lines $p$ $p$. When the key K is closed, the armature $q$ will be attracted by the magnet M, closing the points 3 4, and the condenser will receive a charge of current from the battery B. When the key is opened, the condenser will discharge an impulse of high intensity through the points 5 6 into the cable conductor $p'$, which will find a ground at $C'$. The passing of such discharge along the conductor will induce a current in the inductor, which will manifest itself in the telephone above all other sounds. It is obvious that if while impulses are steadily thrown to the line by the manipulation of the key the inductor be moved along the cable J it will continue to repeat the impulses so long as the line on which they are sent out is uninterrupted. If the inductor be moved along past the ground $C'$, the sounds will be lost, provided the grounding be complete, or if it is only a partial leak then beyond the ground $C'$ the sounds will be weakened, so that it will be possible to locate the exact spot of the fault either by the cessation of the sounds or by their sudden weakening. The spring $d$, attached to but insulated from the lever $l$, connects the line $p'$ with the ground through the points 1 2 after each condenser-discharge, the object being to completely discharge the line after each charge from the condenser. This additional grounding, however, will not often be required. A mechanical substitute for the key K is shown in Fig. IV. A motor $m'$ is represented as driving a wheel $p''$, on the spindle of which is a contact-wheel $n'$. Projections on the periphery of this said wheel $n'$ make contact with a spring $u$, completing a circuit from the battery $B'$ through lines $o'$, springs $i'$ and $u$, and magnet M. With such an attachment regular and specific signals could be steadily sent to the line and no attendant would be required at the sending apparatus while search was in progress for faults. Preferably the signal put in the line should be a constant and unvariable one, so that the one carrying the inductor would always be able to recognize it. This would be accomplished by this mechanical substitute for the key. With cables or lines where there would be no confusion of sounds a simpler method of signaling may be employed. In Fig. V, $j\,j'$ represent a pair of suspended lines where there is a "cross," (indicated at the point $e$.) A mechanical device similar to that just described—that is, a motor $m$, driving a wheel $p''$, carrying a contact-disk $n$—may be employed to send impulses, say, from a dynamo by the line $h$ through the spring $i$ into the line $j$. These impulses would pass partly or wholly over to and find grounds in the grounds of the line $j'$. By the loss of the sounds or by their weakening in passing the point $e$ with the inductor the fault would be precisely located at $e$.

There are numerous devices that might be employed for the purpose of this signaling, the important consideration being the employment of a current that shall make itself distinctly manifest through the inductor. An arrangement of a motor and connections is shown in Fig. VI which will accomplish about the same objects as the apparatus shown in Fig. I. The motor is represented as having its armature-shaft in contact with the line $p$ from the condenser $C'$, the opposite end of the said condenser being grounded at $c''$. An insulated hub 10 on the said spindle contains a spur 11, which is in contact with the armature-spindle. A spring 12 on one side of the said hub is connected with a line $h$, which may come from a dynamo or battery. A spring 13 on the opposite side of said hub is connected with a faulty line $j''$. The revolutions of the armature bring the spur 11 alternately in contact with the springs 12 and 13. When the spur comes in contact with spring 12, a current is thrown into the condenser, and as the spur strikes spring 13 a static discharge is thrown from the condenser into the line.

In the use of an inductor, while the one herein shown has advantages in that the half-circular form removes the outside wires from those intended to be presented parallel with the cable, thus somewhat avoiding self-induction of the coil, this form of inductor is not essential. It has, however, an advantage of a form easily carried and of presenting an amount of surface toward the circuit to be tested that it is efficient for carrying above ground to examine and test a line that may be four feet or more under ground.

Delicate indicating instruments may also be used in conjunction with the inductor instead of a telephone; but there is probably nothing more effective and certainly nothing more convenient for the purpose than the telephone.

What I claim, and desire to secure by Letters Patent of the United States, is—

1. For locating faults in electric circuits the combination of a double-contact relay having one of its contacts connected with the faulty line and its other contact connected with a grounded battery, the lever of said relay connected with a grounded condenser and actuated by an interrupted local circuit, and an inductor in circuit with an indicator held contiguous to the faulty circuit, substantially as herein shown and described.

2. For locating faults in electric circuits the combination with the faulty circuit of a double-contact relay, a local battery or other source of current connected with one of the contacts of the relay and the ground, the faulty circuit connected with the other contact of said relay, a condenser connected with the lever of said relay and the ground, a local source of current and an interrupter for energizing the magnet of said relay, and an inductor in circuit with an indicator, all substantially as herein shown and described.

Signed at New York city, in the county of New York and State of New York, this 18th day of January, A. D. 1899.

WILLIAM EDWARD ATHEARN.

Witnesses:
H. A. SMITH,
JAMES HAMBLET.